United States Patent
Lee et al.

(10) Patent No.: US 12,327,179 B2
(45) Date of Patent: Jun. 10, 2025

(54) PROCESSOR, METHOD OF OPERATING THE PROCESSOR, AND ELECTRONIC DEVICE INCLUDING THE SAME

(71) Applicants: Samsung Electronics Co., Ltd., Suwon-si (KR); Seoul National University R&DB Foundation, Seoul (KR)

(72) Inventors: Seung Wook Lee, Suwon-si (KR); Jaeyeon Won, Seoul (KR); Jae Wook Lee, Seoul (KR); Tae Jun Ham, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 1001 days.

(21) Appl. No.: 17/375,197

(22) Filed: Jul. 14, 2021

(65) Prior Publication Data

US 2022/0253682 A1  Aug. 11, 2022

(30) Foreign Application Priority Data

Feb. 8, 2021 (KR) .................. 10-2021-0017469

(51) Int. Cl.
*G06N 3/063* (2023.01)
*G06F 5/01* (2006.01)
(Continued)

(52) U.S. Cl.
CPC .............. *G06N 3/063* (2013.01); *G06F 5/01* (2013.01); *G06F 7/50* (2013.01); *G06F 7/523* (2013.01);
(Continued)

(58) Field of Classification Search
CPC .......... G06F 7/5443; G06F 7/78; G06F 17/16
See application file for complete search history.

(56) References Cited

U.S. PATENT DOCUMENTS

| | | |
|---|---|---|
| 5,157,399 A | 10/1992 | Kobayashi et al. |
| 10,373,049 B2 | 8/2019 | Young |

(Continued)

FOREIGN PATENT DOCUMENTS

| | | | |
|---|---|---|---|
| JP | 11-331107 A | 11/1999 | |
| JP | 3210420 B2 | 9/2001 | |

(Continued)

OTHER PUBLICATIONS

Yu, Jiecao, et al. "TF-Net: Deploying Sub-Byte Deep Neural Networks on Microcontrollers." ACM Transactions on Embedded Computing Systems (TECS) 18.5s (2019): 1-21.

(Continued)

*Primary Examiner* — Michael D. Yaary
(74) *Attorney, Agent, or Firm* — NSIP Law

(57) ABSTRACT

A processor, a method of operating the processor, and an electronic device including the processor are disclosed. The method includes arranging, in respective input registers, weights and activations having a smaller number of bits than a minimum operation unit of an operator included in the processor, performing a multiplication between values stored in the input registers, storing a result of the multiplication in an output register, and outputting, from the output register, a value in a preset bit range as a result of a dot product between a first vector including the weights and a second vector including the activations.

20 Claims, 15 Drawing Sheets

(51) Int. Cl.
    *G06F 7/50*         (2006.01)
    *G06F 7/523*       (2006.01)
    *G06F 7/544*       (2006.01)
    *G06F 7/78*         (2006.01)
    *G06F 17/16*       (2006.01)

(52) U.S. Cl.
    CPC .............. *G06F 7/5443* (2013.01); *G06F 7/78* (2013.01); *G06F 17/16* (2013.01)

(56) References Cited

U.S. PATENT DOCUMENTS

| | | |
|---|---|---|
| 10,410,098 B2 | 9/2019 | Nealis et al. |
| 10,678,508 B2 | 6/2020 | Vantrease et al. |
| 2018/0046900 A1* | 2/2018 | Dally ............... G06F 17/11 |
| 2018/0174022 A1 | 6/2018 | Young |
| 2018/0189649 A1* | 7/2018 | Narayan ................. G06N 3/08 |
| 2018/0307950 A1 | 10/2018 | Nealis et al. |
| 2019/0294413 A1 | 9/2019 | Vantrease et al. |
| 2020/0302271 A1 | 9/2020 | Ovtcharov et al. |

FOREIGN PATENT DOCUMENTS

| | | |
|---|---|---|
| JP | 4254201 B2 | 4/2009 |
| KR | 10-2019-0045316 A | 5/2019 |

OTHER PUBLICATIONS

Extended European Search report issued on Apr. 29, 2022, in counterpart European Patent Application No. 21205960.4 (15 pages in English).

* cited by examiner

Algorithm 1 Naive product via Sub-Byte parallelism

Input: $d$-depth packed vector $w, a$ and its size $m$
Output: $m$-depth dot product $w \cdot a$
$sum = 0$
for $i = 0$ to $\frac{m}{d}$ do
　　$sum = sum + (((w_i * a_i) \ \& \ mask) \gg shift)$
end for
return $sum$

FIG.9

Algorithm 2 Optimized product with local accumulation

Input: $d$-depth packed vector $w$, $a$ of size $m$, and $iter$ of local accumulation
Output: $m$-depth dot product $w \cdot a$ $sum = 0$
for $i = 0$ to $\frac{m}{d*iter}$ do
   $local = 0$
   for $j = i * iter$ to $(i+1) * iter$ do
     $local = local + w_j * a_j$    // multiply-add
   end for
   $local = local \;\&\; mask$
   $sum = sum + (local \gg shift)$    // shift-accumulate
end for
return $sum$

FIG.10

PROCESSOR, METHOD OF OPERATING THE PROCESSOR, AND ELECTRONIC DEVICE INCLUDING THE SAME

CROSS-REFERENCE TO RELATED APPLICATIONS

This application claims the benefit under 35 USC § 119(a) of Korean Patent Application No. 10-2021-0017469 filed on Feb. 8, 2021, in the Korean Intellectual Property Office, the entire disclosure of which is incorporated herein by reference for all purposes.

BACKGROUND

1. Field

The following description relates to a process, a method of operating the processor, and an electronic device including the processor.

2. Description of Related Art

Number precision used in a neural network is gradually decreasing in a 32-bit floating-point number (FP32) within a range that allows the accuracy of the neural network to improve an operation speed of an operator and reduce power consumption. Recently, research has been conducted on various ways to accelerate a computing operation by reducing the precision in a neural network while maintaining a certain level of accuracy of the neural network even with bit precision less than FP32.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating a processor, including arranging, in respective input registers, weights and activations having a smaller number of bits than a minimum operation unit of an operator included in the processor, performing a multiplication between values stored in the input registers, storing a result of the multiplication in an output register, and outputting, from the output register, a value in a preset bit range as a result of a dot product between a first vector including the weights and a second vector including the activations.

The arranging may include arranging the weights in a first input register in a first order, and arranging the activations in a second input register in a second order that is a reverse order of the first order.

A number of the weights and a number of the activations to be respectively arranged in the input registers may be determined based on a number of bits of each of the weights, a number of bits of each of the activations, and a number of bits of each of the input registers.

The arranging may include arranging the weights and activations in the input registers at preset intervals, respectively, wherein the preset intervals may be determined based on the number of bits of each of the input registers, and the respective numbers of the weights and activations to be arranged in the input registers.

The preset bit range may be based on a preset interval between the weights or activations respectively arranged in the input registers, and a bit position of an activation or weight arranged at an uppermost bit in each of the input registers.

The outputting may include setting, as 0, a remaining bit value in the preset bit range in the output register, and shifting the value in the preset bit range to a lower bit position.

The arranging may include arranging the weights or activations such that first and last of the weights or activations that are separated from each other at a same interval are maximally separated from each other in a corresponding input register.

The output register may have a greater number of bits than the input registers.

In response to all the weights and activations not being available to be arranged in the input registers the arranging may include sequentially arranging corresponding portions of the weights and activations in the input registers, respectively, the performing may include sequentially performing multiplications between the corresponding portions of the weights and activations sequentially arranged in the respective input registers, and accumulating results of the multiplications in the output register, and the outputting may include outputting, as the result of the dot product, a value in a preset bit range from the output register.

The outputting may include outputting the result of the dot product by setting, as 0, a remaining bit value in the preset bit range in the output register, and shifting the value in the preset bit range to a lower bit position.

The operator may be a multiplier.

The minimum operation unit may be one of 8 bits, 16 bits, 32 bits, and 64 bits.

In another general aspect, there is provided a processor including input registers configured to receive weights and activations having a smaller number of bits than a minimum operation unit of an operator included in the processor, the operator configured to perform a multiplication between values stored in the input registers, and an output register configured to store a result of the multiplication, and to output a value in a preset bit range as a result of a dot product between a first vector including the weights and a second vector including the activations.

In another general aspect, there is provided an electronic device including a memory configured to store weights and activations having a smaller number of bits than a minimum operation unit of an operator included in a processor, and the processor configured to arrange the weights and activations in respective input registers, to perform a multiplication between values stored in the input registers, to store a result of the multiplication in an output register, and to output, from the output register, a value in a preset bit range as a result of a dot product between a first vector including the weights and a second vector including the activations.

The processor may be configured to arrange the weights in a first input register in a first order, and arrange the activations in a second input register in a second order that is a reverse order of the first order.

A number of the weights and a number of the activation to be respectively arranged in the input registers may be determined based on a number of bits of each of the weights, a number of bits of each of the activations, and a number of bits of each of the input registers.

In another general aspect, there is provided an electronic device including a memory configured to store weights and activations of a neural network, and a processor configured to arrange the weights in a first input register in a first order, arrange the activations in a second input register in a second order that is a reverse order of the first order, store, in an output register, a result of a multiplication between a first vector including the weights and a second vector including the activations, and output a value in a preset bit range from the output register, wherein the weights and the activations have a smaller number of bits than a minimum operation unit of an operator in the processor.

The processor may be configured to arrange the activations in the first input registers at a preset interval, and the preset interval is based on a number of bits of the first input register and a number of the activations to be arranged in the first input registers.

The processor may be configured to generate the preset interval based on dividing a difference between the number of bits of the first input register and a number of bits of the activations by one less than a depth of the first input register.

Other features and aspects will be apparent from the following detailed description, the drawings, and the claims.

BRIEF DESCRIPTION OF THE DRAWINGS

FIGS. 9 and 10 illustrate an example of local accumulation-based sub-byte parallelism.

Figure 1:
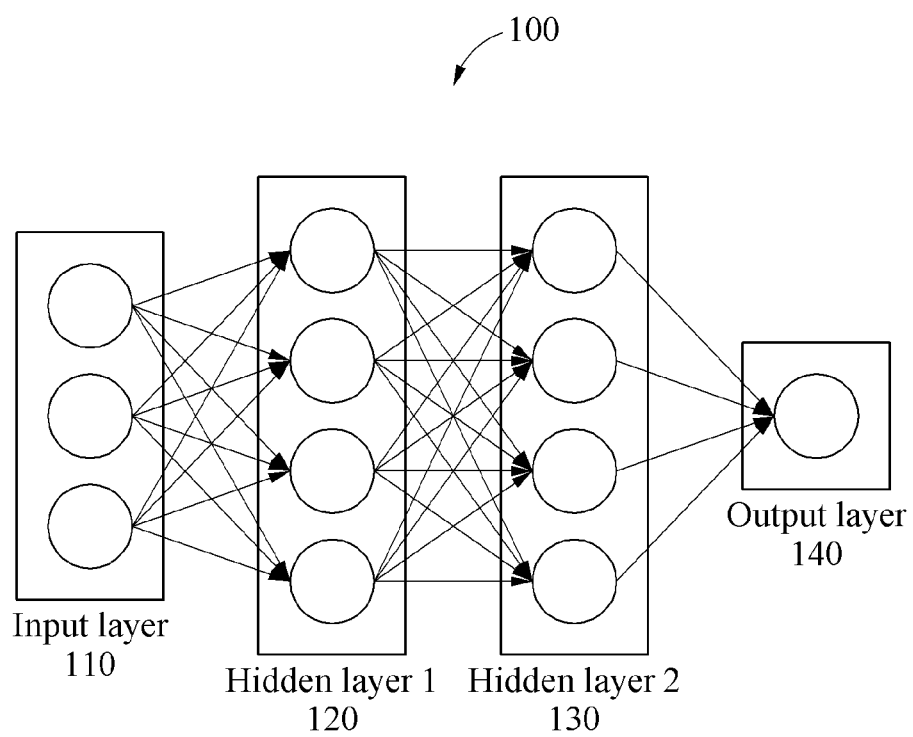
FIG. 1 illustrates an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a neural network.

Referring to FIG. 1, a neural network 100 includes a plurality of layers. The neural network 100 includes an input layer 110, a plurality of hidden layers 120 and 130, and an output layer 140. The neural network 100 may be used to perform a data inference. The data inference may include, for example, pattern recognition (e.g., object recognition, facial identification, etc.), sequence recognition (e.g., speech, gesture, and written text recognition, machine translation, machine interpretation, etc.), control (e.g., vehicle control, process control, etc.), recommendation services, decision making, medical diagnoses, financial applications, data mining, and the like.

Each layer may include a plurality of nodes each referred to as an artificial neuron. Each node may indicate an operation or computation unit having at least one input and output, and the nodes may be connected to one another.

The input layer 110 may include one or more nodes to which data is directly input without being through a connection to another node. The output layer 140 may include one or more output nodes that are not connected to another node. The hidden layers 120 and 130 may be the remaining layers of the neural network 100 from which the input layer 110 and the output layer 140 are excluded, and include nodes corresponding to an input node or output node in a relationship with another node. The neural network 100 is illustrated merely as an example in FIG. 1 for the convenience of description, and thus the scope of examples is not limited to the illustrated structure of the neural network 100 and a structure of a neural network used may vary according to examples. According to examples, the number of hidden layers included in the neural network 100, the number of nodes included in each layer, and/or a connection between the nodes may vary. A neural network including a plurality of hidden layers, such as, for example, the neural network 100, may also be referred to as a deep neural network (DNN).

The neural network 100 may include for example, any one or any combination of a convolutional neural network (CNN), and a recurrent neural network (RNN), a perceptron, a multilayer perceptron, a feedforward (FF) network, a radial basis function (RBF) network, a deep FF (DFF) network, a long short-term memory (LSTM), a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network 100 may correspond to the CNN, and another portion thereof may correspond to the FCN. In this case, the CNN may be referred to as convolutional layers, and the FCN may be referred to as fully connected layers.

A weight may be set for a connection between nodes. For example, a weight may be set for a connection between a node included in the input layer 110 and another node included in the hidden layer 120. The weight may be adjusted or changed. The weight may determine the influence of a related data value on a final result as it increases, decreases, or maintains the data value. The weight may correspond to a parameter of the neural network 100.

To each node included in one layer, weighted values of nodes included in a previous layer may be input. A weighted value may refer to a value obtained as a value of a node included in the previous layer is multiplied by a weight. A process in which weighted data is input from a layer to a subsequent layer of the layer may be referred to as propagation. For example, a value y to be propagated, to the subsequent layer, from a node to which weighted data is propagated from the nodes included in the previous layer may be determined as represented by Equation 1.

$$y = f\left(\sum_{i=0}^{n-1} w_i \cdot a_i + b\right) \quad \text{[Equation 1]}$$

In Equation 1, $a_i$ denotes a value of an ith node included in a previous layer and is also referred to as an activation. $w_i$ denotes a weight that is set for a connection to the ith node included in the previous layer. b denotes a bias, and f denotes an activation function. The activation function f may correspond to sigmoid, hyperbolic tangent (tanh), or a rectified linear unit (ReLU), but not be limited thereto.

In Equation 1, $$\sum_{i=0}^{n-1} w_i \cdot a_i$$

is represented as a dot product operation w·a between a weight vector (w=[$w_0$, $w_1$, ..., $w_{n-1}$]) and an activation vector (a=[$a_0$, $a_1$, ..., $a_{n-1}$]).

A weight and activation may be represented by a small number of bits to improve an operation speed of the neural network 100 and to reduce power consumption. In general, a weight and activation may be represented in FP32 which is a floating format that represents data by 32 bits, or in BF16 which is a brain floating-point format that represents data by 16 bits. These formats may facilitate the performance of an operation by an operator configured to perform neural network-based operations because the formats represent data by a multiple of a minimum operation unit (e.g., 8, 16, 32, and 64 bits), and increase the accuracy in inferences because the formats accurately represent data using a relatively great number of bits. However, using these formats, a great amount of time and resources (e.g., power consumption, memory, etc.) may be used to train a neural network or perform inferences using the neural network, and an operation may not be readily performed in an environment such as a mobile device, which has limited computational limited resources.

In an example, inferences or learning (or training) may be performed by representing weights and activations by a smaller number of bits (e.g., 1-7 bits) than a minimum operation unit of an operator within a range that allows the accuracy in inferences of a neural network. In addition, a dot product of vectors represented by a smaller number of bits than the minimum operation unit may be performed more rapidly with fewer resources by accelerating, by a typical operator without a separate operator, a dot product between a weight vector and an activation vector that are represented by a smaller number of bits than the minimum operation unit, for example, a sum of products (of multiplications) between corresponding weights and activations. Examples will be described in detail hereinafter.

Figure 2:
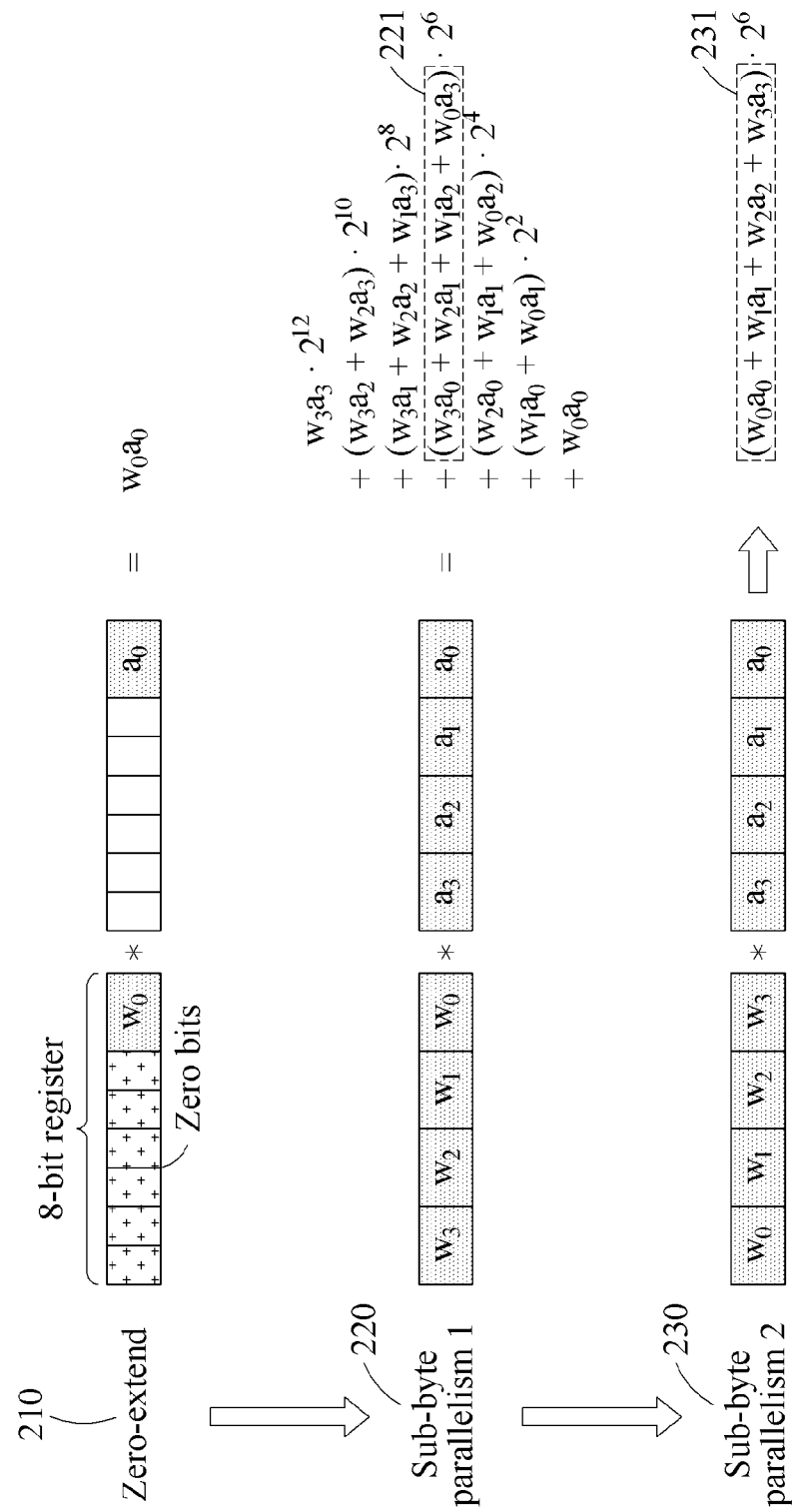
FIG. 2 illustrates an example of sub-byte parallelism.

FIG. 2 illustrates an example of sub-byte parallelism.

Reference numerals 210, 220, and 230 depict instances of how an operator (e.g., multiplier) with a minimum operation unit of 8 bits multiplies values stored in 8-bit input registers (e.g., weight register and activation register) will be described hereinafter with reference to FIG. 2. Although weights $w_0$, $w_1$, $w_2$, and $w_3$ and activations $a_0$, $a_1$, $a_2$, and $a_3$ are illustrated in FIG. 2 as being represented by 2 bits which is a smaller number of bits than the minimum operation unit, examples of the bit number are not limited thereto.

The first case 210 is an example where only one weight $w_0$ and activation $a_0$ are input to the input registers, and zero (0) is input to remaining bits. When the operator multiplies values stored in the input registers, $w_0a_0$ is obtained as an operation result. Most of the bits in the input registers are filled with zeros (0s) and not used for the operation, and thus resources may be wasted, and the operation may not be accelerated to be greater than the preset minimum operation unit in the operator.

The second case 220 is an example where a plurality of weights $w_0$ through $w_3$ and a plurality of activations $a_0$ through $a_3$ are input in the same order to the input registers, respectively. For example, the weight $w_0$ is stored at first and second lower bits of a corresponding input register, the weight $w_1$ is stored at third and fourth lower bits of the input register, the weight $w_2$ is stored at fifth and sixth lower bits of the input register, and the weight $w_3$ is stored at seventh and eighth lower bits of the input register. Similarly, the activations $a_0$ through $a_3$ are stored at respective bits of a corresponding input register. When the operator multiplies values stored in the input registers, an operation result represented as $2^n$ may be obtained as illustrated in a right portion of the second case 220 of FIG. 2. For example, as illustrated, a coefficient 221 of $2^6$ in the operation result may be represented by a sum of products (of multiplications) between the weights and the activations. However, based on that the multiplications in the coefficient 221 of $2^6$ are performed on weights and activations that do not correspond to each other, the order in which the weights and activation are arranged in the input registers may change as illustrated in the third case 230.

The third case 230 is an example where the order of arranging the weights $w_0$ through $w_3$ in a weight register and the order of arranging the activations $a_0$ through $a_3$ in an activation register differ from each other. For example, the weights $w_0$ through $w_3$ are arranged in order from an upper bit to a lower bit in the weight register, whereas the activations $a_0$ through $a_3$ are arranged in order from a lower bit to an upper bit in the activation register. According to other examples, the weights $w_0$ through $w_3$ may be arranged from the lower bit to the upper bit in the weight register, and the activations $a_0$ through $a_3$ may be arranged from the upper bit to the lower bit in the activation register. Such an operation of varying an arrangement order in an input register may be preprocessed after learning of a neural network, and thus, the overhead may be reduced.

When the operator multiplies the values stored in the input registers, a sum of products (of multiplications) between corresponding weights and activations may be obtained as a coefficient 231 of $2^6$ in the operation result. That is, through a scalar multiplication between the values stored in the input registers, a result of a dot product operation which is a vector-vector multiplication may be derived. A sum of products (of multiplications) between weights and activations that are represented by a smaller number of bits than a basic operation unit may be obtained by one-time operation of the operator, and such an operation may thus be referred to as sub-byte parallelism. Such an operation may facilitate the acceleration of a dot product operation between vectors having a smaller number of bits than a minimum operation unit, using a typical, existing operator, without a need for special hardware for an operation with a small number of bits.

The result of the dot product represented by the coefficient 231 of $2^6$ may be stored at seventh and eighth lower bits of an output register. When the result of the dot product is greater than $2^2$, a portion of the result of the dot product may flow to a coefficient of $2^8$. Thus, preventing such an overflow will be described in detail hereinafter with reference to FIGS. 3 through 8.

Figure 3:
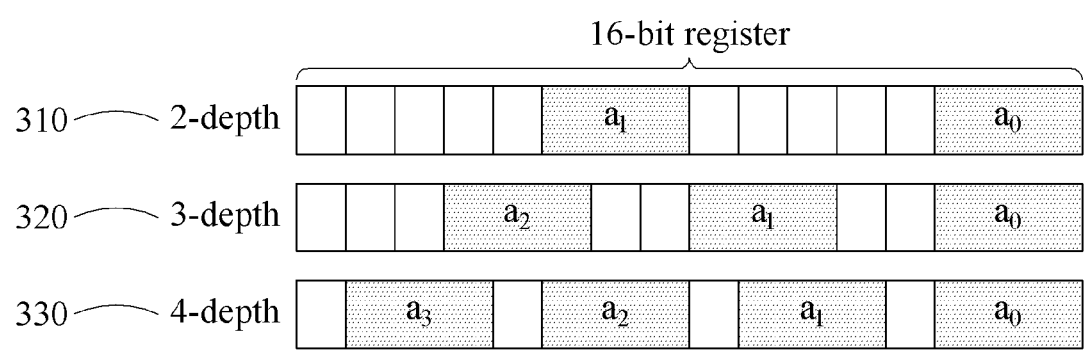
FIGS. 3 through 5 illustrate an example of first packing-based sub-byte parallelism.
Figure 4:
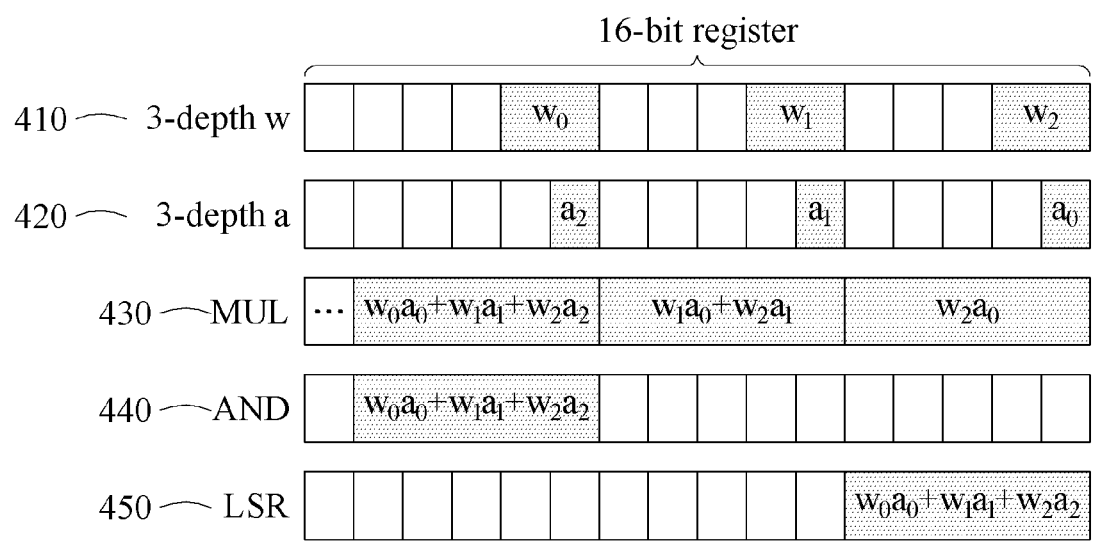
Figure 5:
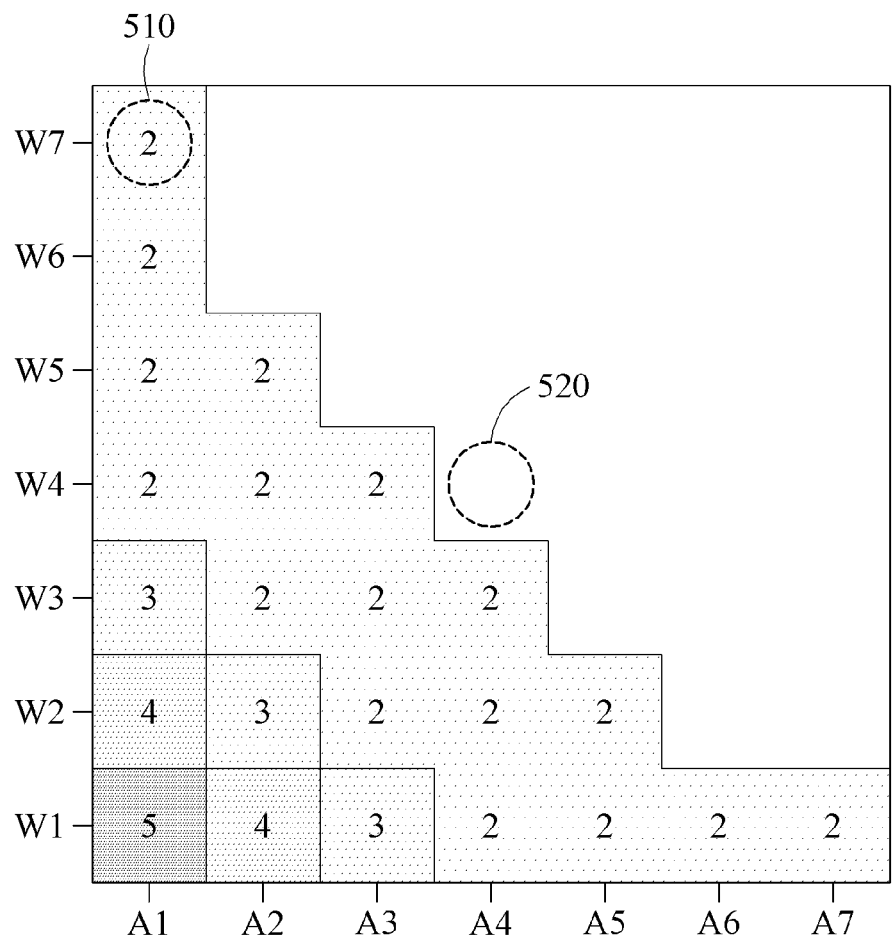

FIGS. 3 through 5 illustrate an example of first packing-based sub-byte parallelism.

As shown in FIG. 3, reference numerals 310, 320, and 330 illustrate examples of how activations are arranged in a 16-bit register based on first packing. In the example of FIG. 3, activations are represented by 3 bits that are less than a minimum operation unit of an operator, and the number of activations to be included in one register is represented by depth. For example, in a case in which the number of activations included in one register is 2, it may be represented by 2-depth or depth-2. The activations may be arranged in the register with the activations being separated from each other at an interval, starting from a lower bit, based on first packing. In an example, the interval may be preset. In the example of FIG. 3, empty spaces between the activations may indicate that zeros (0s) are filled therein. Although the following description provided with reference to FIG. 3 is based on activations for the convenience of description, the following description may also be applicable to weights.

The first case 310 is where two activations $a_0$ and $a_1$ are arranged in the 16-bit register. The activation $a_0$ is stored at first through third lower bits of the register, and the activation $a_1$ is stored at ninth through 11th lower bits. The activations $a_0$ and $a_1$ are arranged with them being separated from each other at an interval of 8 bits.

The second case 320 is where three activations $a_0$, $a_1$, and $a_2$ are arranged in the 16-bit register. The activation $a_0$ is stored at first through third lower bits of the register, the activation $a_0$ is stored at sixth through eighth lower bits of the register, and the activation $a_2$ is stored at 11th through 13th lower bits of the register. The activations $a_0$, $a_1$, and $a_2$ are arranged with them being separated from each other at an interval of 5 bits.

The third case 330 is where four activations $a_0$, $a_1$, $a_2$, and $a_3$ are arranged in the 16-bit register. The activation $a_0$ is stored at first through third lower bits of the register, the activation $a_1$ is stored at fifth through seventh lower bits of the register, the activation $a_2$ is stored at ninth through 11th lower bits of the register, and the activation $a_3$ is stored at 13th through 15th lower bits of the register. The activations $a_0$, $a_1$, $a_2$, and $a_3$ are arranged with them being separated from each other at an interval of 4 bits.

In an example, by generalizing a preset interval between activations based on first packing, in a case in which activations are arranged in an r-bit register with d-depth, the activations may be arranged in the register at an interval of [r/d] bits.

Referring to FIG. 4, weights and activations may be arranged in 16-bit registers, respectively, with 3-depth, and then an operation may be performed accordingly. In the example of FIG. 4, each of weights $w_0$, $w_1$, and $w_2$ is represented by 2 bits smaller than a basic operation unit (e.g., 16 bits), and each of activations $a_0$, $a_1$, and $a_2$ is represented by 1 bit smaller than the basic operation unit. In this example, the weights $w_0$, $w_1$, and $w_2$ and the activations $a_0$, $a_1$, and $a_2$ are arranged in respective registers 410 and 420 at an interval of 5 bits based on first packing.

A 16-bit operator may perform a multiplication (MUL as illustrated) 430 between values stored in the registers 410 and 420 and store a result therefrom in an output register. The operator may have the same bit number as the registers 410 and 420. A value stored in 11th to 15th lower bits in the output register may correspond to a result of a dot product between a weight vector (w=[$w_0$, $w_1$, $w_2$]) and an activation vector (a=[$a_0$, $a_1$, $a_2$]). To remove a value of remaining bits, except for the 11th to 15th lower bits, from the output register, an AND operation 440 may be performed between values stored in the output register and a 16-bit filter in which the value of the 11th to 15th lower bits is 1 and the value of the remaining bits is 0 may be performed. In an example, a logical shift right (LSR) operation 450 may be performed on the value of the 11th to 15th lower bits remained in the output register to shift it such that the result of the dot product is stored at first to fifth bits of the output register.

In the example of FIG. 4, the result of the dot product may be stored in the 11th to 15th bits of the output register. However, when the result of the dot product is greater than a value of $2^5-1$, an overflow of a portion of the result of the dot product to a 16th bit of the output register may occur. To prevent such an overflow, a maximum value of the result of the dot product may be less than a maximum value that may be represented by bits allocated to store the result of the dot product, which may be represented by Equation 2.

$$d \cdot (2^x-1) \cdot (2^y-1) < 2^{\lfloor r/d \rfloor}$$ [Equation 2]

In Equation 2 above, d denotes depth. x denotes the number of bits of a weight, and y denotes the number of bits of an activation. $(2^x-1) \cdot (2^y-1)$ denotes a maximum value of a product (of a multiplication) between the weight and the activation. In the case of d-depth, the multiplication between the weight and the activation may be performed d times, and results therefrom may be added. Thus, $d \cdot (2^x-1) \cdot (2^y-1)$ may denote the maximum value of the result of the dot product. [r/d] denotes an interval between weights or an interval between activations. The result of the dot product may be extracted from bits corresponding to the corresponding size from the output register, and thus $2^{\lfloor r/d \rfloor}$ may denote a maximum value that may be represented by bits allocated to store the result of the dot product.

According to first packing, the interval between the weights and the interval between the activations may be determined to be [r/d], and sub-byte parallelism described above may be performed without an overflow when Equation 2 above is satisfied. The result of the dot product may be stored in a preset bit range in the output register. The preset bit range may indicate a range from a jth lower bit to a j+(k−1)th lower bit. The jth lower bit may indicate a start bit of an uppermost bit group among d bit groups that store therein d weights or activations in an input register, and k denotes a preset interval for the weights or activations.

Referring to FIG. 5, there is a maximum depth based on the number of bits of weights and activations to be arranged in 16-bit registers, respectively. In the example of FIG. 5, in A1, A2, . . . , A7 on an x axis, A indicates an activation and an accompanied number indicates the number of bits of the activation. Similarly, in W1, W2, . . . , W7 on a y axis, W indicates a weight and an accompanied number indicates the number of bits of the weight. The numbers illustrated in a table indicate maximum depths. For example, the 16-bit registers may include therein the weights and activation with maximally 2-depth under the condition that there is not an overflow at W7A1 510. Equation 2 may not be satisfied at W4A4 520 of the 16-bit registers, and thus sub-byte parallelism based on first packing may not be available.

Hereinafter, second packing that may prevent an overflow more effectively than first packing under the same depth condition will be described in detail with reference to FIGS. 6 through 8.

Figure 6:
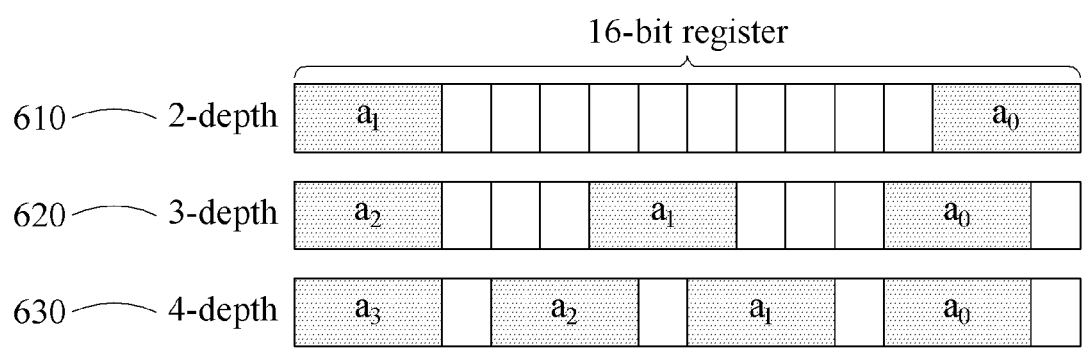
FIGS. 6 through 8 illustrate an example of second packing-based sub-byte parallelism.
Figure 7:
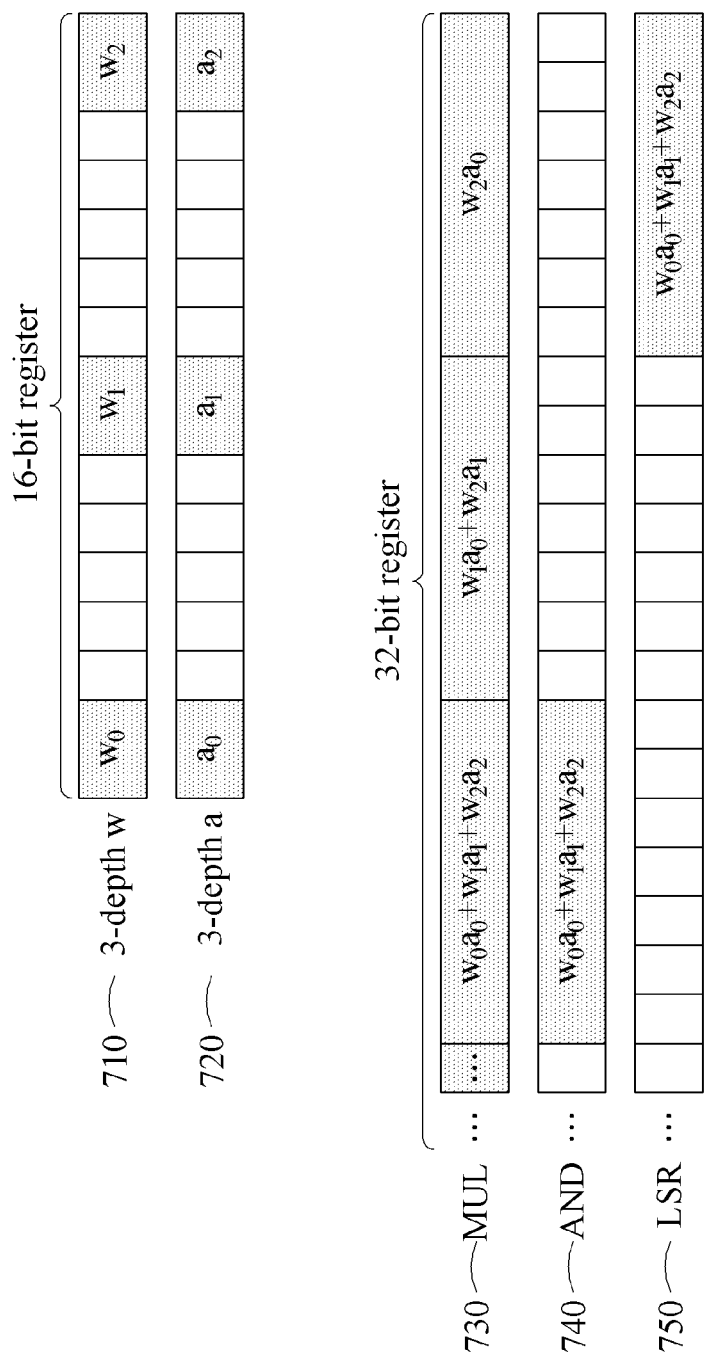
Figure 8:
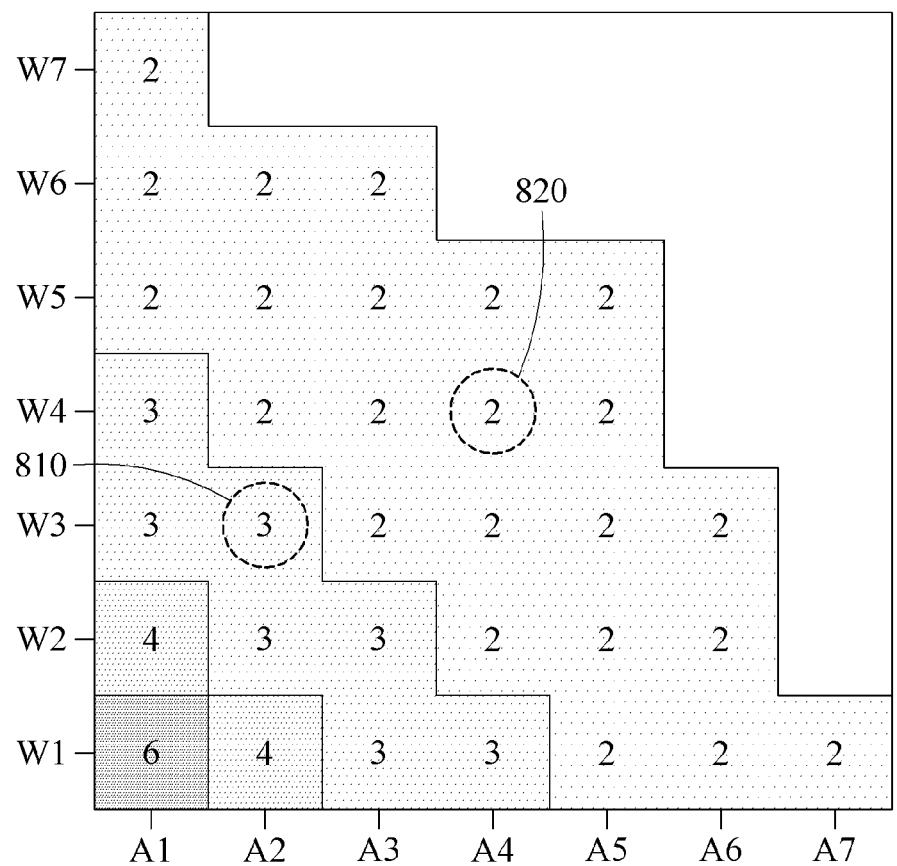

FIGS. 6 through 8 illustrate an example of second packing-based sub-byte parallelism.

Reference numerals 610, 620, and 630 illustrate example of activations being arranged in a 16-bit register based on second packing that will be described with reference to FIG. 6. In the example of FIG. 6, activations are represented by 3 bits which is smaller than a minimum operation unit (e.g., 16 bits) of an operator, and the number of activations included in one register is represented by depth. According to second packing, the activations may be arranged in the register at the same interval such that first and last ones among the activations are maximally separated from each other. In the example of FIG. 6, empty spaces between the activations indicate that 0 is filled therein. Although the example of FIG. 6 is described based on activations for the convenience of description, the description of the example may also be applicable to weights.

The first case 610 is where two activations $a_0$ and $a_1$ are arranged in the 16-bit register. The activation $a_0$ is stored at first to third lower bits of the register, and the activation $a_1$ is stored at 14th to 16th lower bits of the register. The activations $a_0$ and $a_1$ are arranged such that they are separated from each other at an interval of 13 bits.

The second case 620 is where three activations $a_0$, $a_1$, and $a_2$ are arranged in the 16-bit register. The activation $a_0$ is stored at second to fourth lower bits of the register, the activation $a_1$ is stored at lower eighth to tenth bits of the register, and the activation $a_2$ is stored at 14th to 16th lower bits of the register. The activations $a_0$, $a_1$, and $a_2$ are arranged such that they are separated from each other at an interval of 6 bits.

The third case 330 is where four activations $a_0$, $a_1$, $a_2$, and $a_3$ are arranged in the 16-bit register. The activation $a_0$ is stored at second to fourth lower bits of the register, the activation $a_1$ is stored at sixth to eighth lower bits of the register, the activation $a_2$ is stored at 10th to 12th bits lower of the register, and the activation $a_3$ is stored at 14th to 16th lower bits of the register. The activations $a_0$, $a_1$, $a_2$, and $a_3$ are arranged such that they are separated from each other at an interval of 4 bits.

By arranging the last activation among the activations such that it is stored at an uppermost bit of the register according to second packing, a greater interval may be achieved under the same depth condition compared to first packing. Thus, it is possible to effectively prevent an occurrence of an overflow. By generalizing a preset interval of activations based on second packing, in a case in which activations having y bits are arranged in an r-bit register with d-depth, the activations may be arranged in the register at an interval of $$\left\lfloor \frac{r-y}{d-1} \right\rfloor \text{ bits.}$$

Referring to FIG. 7, weights and activations may be arranged in 16-bit registers, respectively, with 3-depth, and then an operation may be performed accordingly. In the example of FIG. 7, each of weights $w_0$, $w_1$, and $w_2$ and activations $a_0$, $a_1$, and $a_2$ is represented by 2 bits which is smaller than a basic operation unit (e.g., 16 bits) of an operator. According to second packing, the weights $w_0$, $w_1$, and $w_2$ and the activations $a_0$, $a_1$, and $a_2$ may be arranged in respective registers 710 and 720 at an interval of 7 bits.

The operator may perform a multiplication 730 between values stored in the registers 710 and 720 and store results therefrom in a 32-bit output register. A value stored at 15th to 21st lower bits of the output register may correspond to a result of a dot product between a weight vector (w=[$w_0$, $w_1$, $w_2$]) and an activation vector (a=[$a_0$, $a_1$, $a_2$]). The result of the dot product may be stored at the 15th to 21st lower bits, and thus the output register may have a greater number of bits (e.g., 32 bits) than the input registers 710 and 720.

To remove a value of remaining bits, except for the 15th to 21st lower bits, from the output register, an AND operation 740 may be performed between values stored in the output register and a 16-bit filter in which the value of the 15th to 21st lower bits is 1 and the value of the remaining bits is 0. In an example, an LSR operation 750 may be performed on the value of the 15th to 21st lower bits remained in the output register to shift it such that the result of the dot product is stored at first to seventh bits of the output register.

In the example of FIG. 7, the result of the dot product may be stored at the 15th to 21st lower bits in the output register. However, in a case in which the result of the dot product is greater than $2^7-1$, an overflow of a portion of the result of the dot product may flow to a 12th bit of the output register. To prevent such an overflow, a maximum value of the result of the dot product may need to be less than a maximum value that may be represented by bits allocated to store the result of the dot product, which may be represented by Equation 3.

$$d \cdot (2^x - 1) \cdot (2^y - 1) < 2^{\lfloor \frac{r-y}{d-1} \rfloor} \quad \text{[Equation 3]}$$

In Equation 3 above, $d \cdot (2^x-1) \cdot (2^y-1)$ denotes a maximum value of a dot product.

$$2^{\lfloor \frac{r-y}{d-1} \rfloor}$$

denotes a maximum value that may be represented by bits allocated to store a result of the dot product.

According to second packing, sub-byte parallelism described above may be performed without an overflow, when Equation 3 above is satisfied. The result of the dot product may be stored in a preset bit range in the output register. The preset bit range may indicate a range from a jth lower bit to a j+(k−1)th lower bit. The jth lower bit may indicate a start bit of an uppermost bit group among d bit groups that store therein d weights or activations in an input register, and k denotes a preset interval for the weights or activations.

Referring to FIG. 8, there is a maximum depth based on the number of bits of weights and activations to be arranged in 16-bit registers, respectively. In the example of FIG. 8, in A1, A2, . . . , A7 on an x axis, A indicates an activation and an accompanied number indicates the number of bits of the activation. Similarly, in W1, W2, . . . , W7 on a y axis, W indicates a weight and an accompanied number indicates the number of bits of the weight. The numbers illustrated in a table indicate maximum depths. For example, the 16-bit registers may include therein the weights and activation with 3-depth, maximally, under the condition that there is not an overflow at W3A2 810. Compared to the example of FIG. 5 in which maximal 2-depth is available in the case of W3A2 according to first packing, it is possible to effectively increase the maximum depth through second packing. In addition, even at W4A4 820 at which sub-byte parallelism is not available through first packing, sub-byte parallelism may be available with maximal 2-depth through second packing.

FIGS. 9 and 10 illustrate an example of local accumulation-based sub-byte parallelism.

FIG. 9 illustrates an example of an iteration of sub-byte parallelism. For the convenience of description, it is assumed in the example of FIG. 9 that sub-byte parallelism described above with reference to FIG. 4 is performed. In a case in which a vector dimension n of a weight vector (w=[$w_0$, $w_1$, . . . , $w_{n-1}$]) and an activation vector (a=[$a_0$, $a_1$, . . . , $a_{n-1}$]) which are targets for a dot product is 9, one-time processing of the sub-byte parallelism may not be sufficient to obtain a result of the dot product, and thus the sub-byte parallelism may need to be performed three times. Even in such a case, a condition that a sum of results of the sub-byte parallelism performed three times is not greater than $2^5-1$ may need to be satisfied in order to prevent an overflow.

According to an algorithm illustrated in FIG. 9, weights $w_0$, $w_1$, and $w_2$ and activations $a_0$, $a_1$, and $a_2$ may be arranged in input registers, respectively. The multiplication 430, the AND operation 440, and the LSR operation 450, which are described above with reference to FIG. 4, may be performed. In an example, weights $w_3$, $w_4$, and $w_5$ and activations $a_3$, $a_4$, and $a_5$ may be arranged in the input registers, respectively. The multiplication 430, the AND operation 440, and the LSR operation 450, which are described above with reference to FIG. 4, may then be performed. Results therefrom may be added to results obtained by performing the sub-byte parallelism for the first time and then stored. In an example, weights $w_6$, $w_7$, and $w_8$ and activations $a_6$, $a_7$, and $a_8$ may be arranged in the input registers, respectively. The multiplication 430, the AND operation 440, and the LSR operation 450, which are described above with reference to FIG. 4, may then be performed. Results therefrom may be added to results obtained by performing the sub-byte parallelism for the first time and the second time and then stored. In the algorithm of FIG. 9, m, which denotes a total length of an array on which a dot product is performed, may be the same as the number of vector dimensions and represented as an m-depth dot product, a depth-m dot product, or an m-dimensional dot product. In addition, mask denotes an AND operation, and shift denotes an LSR operation.

That is, according to the algorithm of FIG. 9, for the three-time processing of the sub-byte parallelism, 12 instructions represented as (MUL-AND-LSR-ADD)*3 may be executed. In addition, since fused multiply-add (FMA), which is an instruction combined with MUL-ADD cannot be applied, many instruction cycles may be needed.

FIG. 10 illustrates an example of an iteration of sub-byte parallelism based on local accumulation. An instruction order described above with reference to FIG. 10 may be changed to effectively reduce an instruction cycle. For example, rather than performing an AND operation, an LSR operation, and ADD operation, each time sub-byte parallelism is performed one time, it may be possible to effectively reduce the instruction cycle by first adding results obtained by performing the sub-byte parallelism several times and then performing once each of the AND operation, the LSR operation, and the ADD operation. When an algorithm of the example of FIG. 10 is applied to the assumption of the example of FIG. 9, ((MUL-ADD)*3)-AND-LSR-ADD instructions may be executed. Since (MUL-ADD) may be replaced with FMA, the three-time processing of the sub-byte parallelism that is desired to be performed in the example of FIG. 9 may be completed only with a total of six instructions corresponding to (FMA*3)-AND-LSR-ADD. By changing the instruction order as described above when performing the same operations, it is possible to efficiently reduce the instruction cycle.

In the algorithm of the example of FIG. 10, iter denotes a parameter indicating the number of times a local accumulation is performed. In addition, an inner loop "for j=i*iter to (i+1)*iter" indicates that the local accumulation is performed as many times as iter and, for this, the for statement may be written in duplicate.

For the convenience of description, it is assumed that a 600-depth dot product is performed based on a total array length of m (m=600), 2-depth sub-byte parallelism (d=2), and local accumulation (iter=3). After the local accumulation is performed iteratively (iter=3) in the inner loop, a partial result of the dot product may be extracted through mask (that is, AND operation) and shift (that is, LSR operation). Since d-depth sub-byte parallelism is applied, the partial dot product result of iter*d=6-depth may be extracted. To obtain the final 600-depth dot product result, such a process of extracting the partial dot product result may need to be repeated 100 times, which may be represented by an outer loop for $$i = 0 \text{ to } \frac{m}{d*iter}.$$

Figure 11:
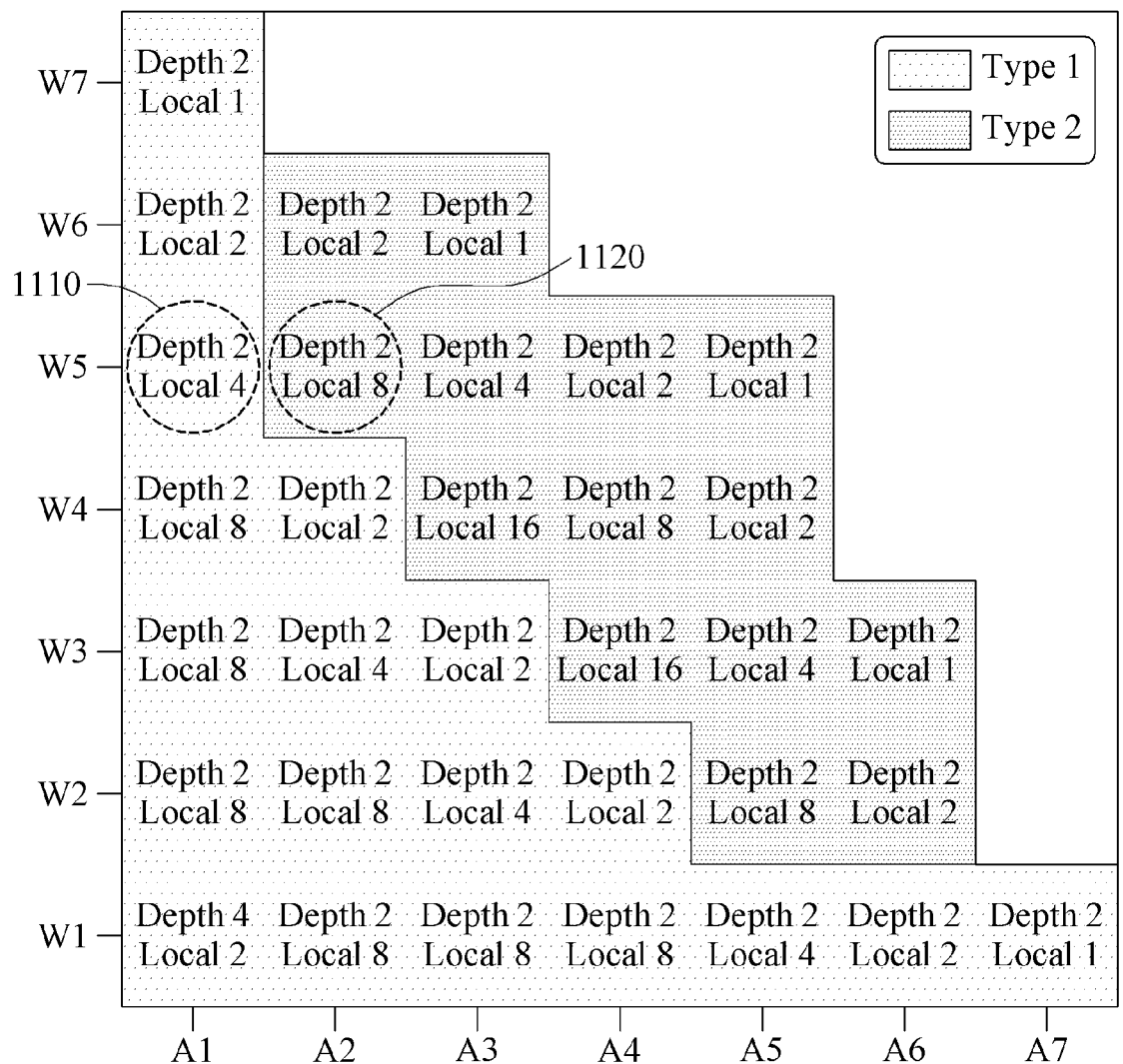
FIG. 11 illustrates an example of a maximum depth and local with respect to the number of bits of weights and activations.

FIG. 11 illustrates an example of a maximum depth and local with respect to the number of bits of weights and activations.

In the example of FIG. 11, an x axis indicates the number of bits of activations arranged in a 16-bit register, and a y axis indicates the number of bits of weights arranged in a 16-bit register. The inside of the table may indicate which packing is better from among the first packing and the second packing described above based on the number of bits of each of weights and activations, and a maximum depth and a maximum local in each case may be indicated. The maximum local may indicate the number of times of sub-byte parallelism to which the method described above with reference to FIG. 10 is applied. For example, the 16-bit registers may include weights and activations with maximal 2-depth based on the first packing under a condition that an overflow does not occur at W5A1 1110, and the sub-byte parallelism may be performed four times iteratively. In addition, the 16-bit registers may include weights and activations with maximal 2-depth based on the second packing under a condition that an overflow does not occur at W5A2 1120, and the sub-byte parallelism may be performed eight times iteratively.

Figure 12:
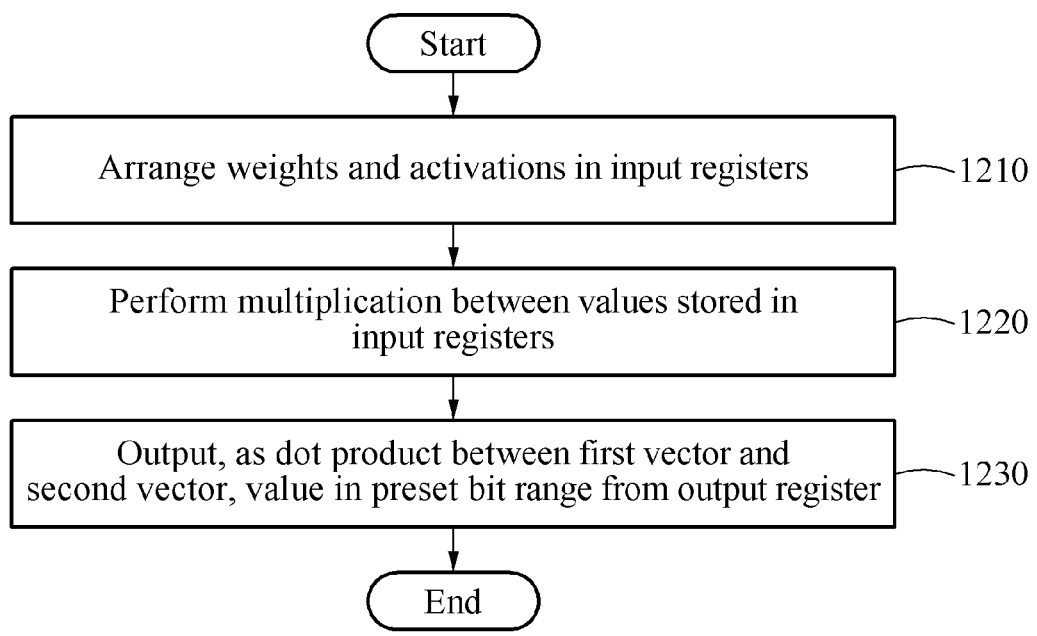
FIG. 12 illustrates an example of a method of operating a processor.

FIG. 12 illustrates an example of a method of operating a processor. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

An example of how a processor obtains a dot product between vectors using a typical multiplier will be described hereinafter with reference to FIG. 12. The processor may include an input register, an operator (e.g., multiplier), and an output register. Although to be described hereinafter, the processor may be embodied as a host processor or an accelerator included in an electronic device.

Referring to FIG. 12, in operation 1210, the processor arranges, in respective input registers, weights and activations having a smaller number of bits than a minimum operation unit of the operator. For example, the processor may arrange the weights in a first input register in a first order, and arrange the activations in a second input register in a second order which is a reverse order of the first order. The number of weights and activations to be arranged in the input registers, respectively, may be determined based on the number of bits of each of the weights, the number of bits of each of the activations, and the number of bits of each of the input registers.

For example, the processor may arrange the weights and activations in the input registers at a preset interval. The preset interval may be determined based on the number of bits of each of the input registers and the respective numbers of the weights and activations to be arranged respectively in the input registers.

For another example, the processor may arrange the weights or activations such that first and last ones of the weights or activations separated from each other at the same interval are maximally separated from each other. In an example, the output register may have a greater number of bits than the input registers.

In operation 1220, the processor performs a multiplication between values stored in the input registers. The processor may perform a general multiplication between the values stored in the input registers.

In operation 1230, the processor outputs, from the output register in which a result of the multiplication is stored, a value in a preset bit range as a result of a dot product between a first vector including the weights and a second vector including the activations. The preset bit range may be determined based on the preset interval between the weights and the activations arranged respectively in the input registers, and a bit position of an activation or weight arranged at an uppermost bit in each of the input registers. The processor may set a remaining bit value in the preset bit range as 0, and shift the value in the preset bit range to a lower bit position.

For example, when not all the weights and activations are arranged respectively in the input registers, the processor may sequentially arrange corresponding portions of the weights and activations in the input registers, respectively. The processor may sequentially perform multiplications between the corresponding portions of the weights and activations sequentially arranged in the respective input registers. The processor may then output a value in a preset bit range as the result of the dot product from the output register in which results of the sequentially performed multiplications are accumulated.

The examples described above may be applied without limitations, if a dot product between vectors is needed to an operation performed in a neural network and even to other application in addition to a neural network-based operation. In such a case, the names of a weight vector and an activation vector described herein may change. In addition, depth may vary depending on the number of bits of weights and/or activations when packing the weights and activations in registers, despite the same number of bits of the registers. Thus, an operation speed of sub-byte parallelism may change depending on the number of bits of weights and/or activations.

Figure 13:
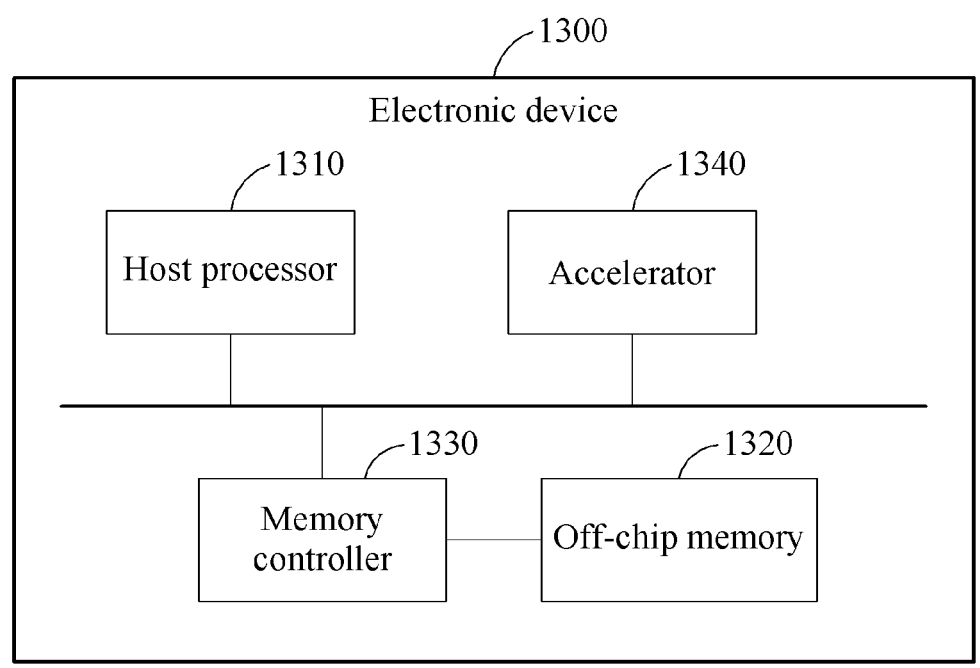
FIG. 13 illustrates an example of a configuration of an electronic device.

FIG. 13 illustrates an example of a configuration of an electronic device.

Referring to FIG. 13, an electronic device 1300 includes a host processor 1310, an off-chip memory 1320, a memory controller 1330, and an accelerator 1340. The host processor 1310, the off-chip memory 1320, the memory controller 1330, and the accelerator 1340 may communicate with one another through a bus, a network on a chip (NoC), a peripheral component interconnect express (PCIe), and the like.

The host processor 1310 may be a device configured to control respective operations of the components included in the electronic device 1300 and include a central processing unit (CPU), a graphics processing unit (GPU), or any of the other devices described below, with reference to the accelerator 1340, for example. The host processor 1310 may control operations performed in the electronic device 1300. The host processor 1310 may receive one or more requests for processing a neural network in the accelerator 1340, and generate an instruction that is executable in the accelerator 1340 in response to the received requests and transfer the generated instruction to the accelerator 1340.

The off-chip memory 1320 may be a memory disposed outside the accelerator 1340, for example, a dynamic random-access memory (DRAM)), a static RAM (SRAM), a thyristor RAM (T-RAM), a zero-capacitor RAM (Z-RAM), a twin-transistor RAM (TTRAM), or a high bandwidth memory (HBM) may be used as a main memory of the electronic device 1300. The off-chip memory 1320 may store inference target data and/or parameters of the neural network to be executed in the accelerator 1340, and data stored in the off-chip memory 1320 may be transferred to the accelerator 1340 for an inference. In an example, the off-chip memory 1320 may also be used in a case in which an on-chip memory inside the accelerator 1340 is not sufficient to execute the neural network in the accelerator 1340.

The accelerator 1340 may be an artificial intelligence (AI) accelerator configured to execute the neural network according to the instruction of the host processor 1310 and infer data to be input. In an example, the accelerator 1340 may be a separate processor distinguished from the host processor 1310. The accelerator 1340 may be a microprocessor, single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, a multiprocessor, a central processing unit (CPU), neural processing unit (NPU), a graphics processing unit (GPU), a tensor processing unit (TPU), a digital signal processor (DSP), a controller and an arithmetic logic unit (ALU), a field-programmable gate array (FPGA), an application-specific integrated circuit (ASIC), a programmable logic unit (PLU), or an application processor (AP).

The accelerator 1340 may process a task that is more effectively processed by a separate dedicated processor, for example, the accelerator 1340, than by the host processor 1310 used for general purposes based on the characteristics of operations of the neural network. Here, one or more processing elements (PEs) included in the accelerator 1340, and the on-chip memory may be used. The on-chip memory may be a device including a global shared buffer and a local buffer that are included in the accelerator 1340 and be distinguished from the off-chip memory 1320 disposed outside the accelerator 1340. The on-chip memory may include, for example, a scratchpad memory accessible through an address space, a static random-access memory (SRAM), or the like.

The processor described herein may be embodied as the host processor 1310 or the accelerator 1340. Further description of the processor is provided below.

Figure 14:
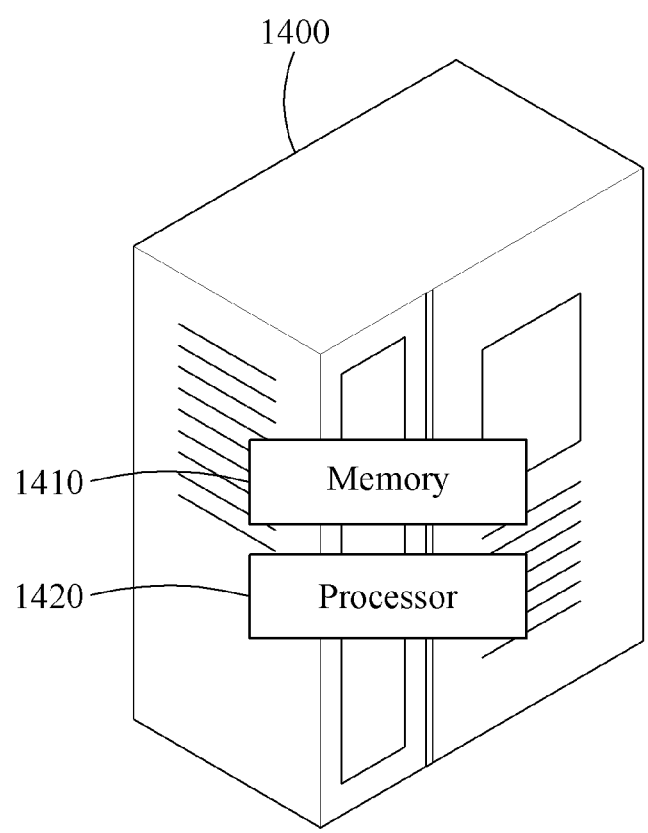
FIGS. 14 and 15 illustrate examples of an electronic device.
Figure 15:
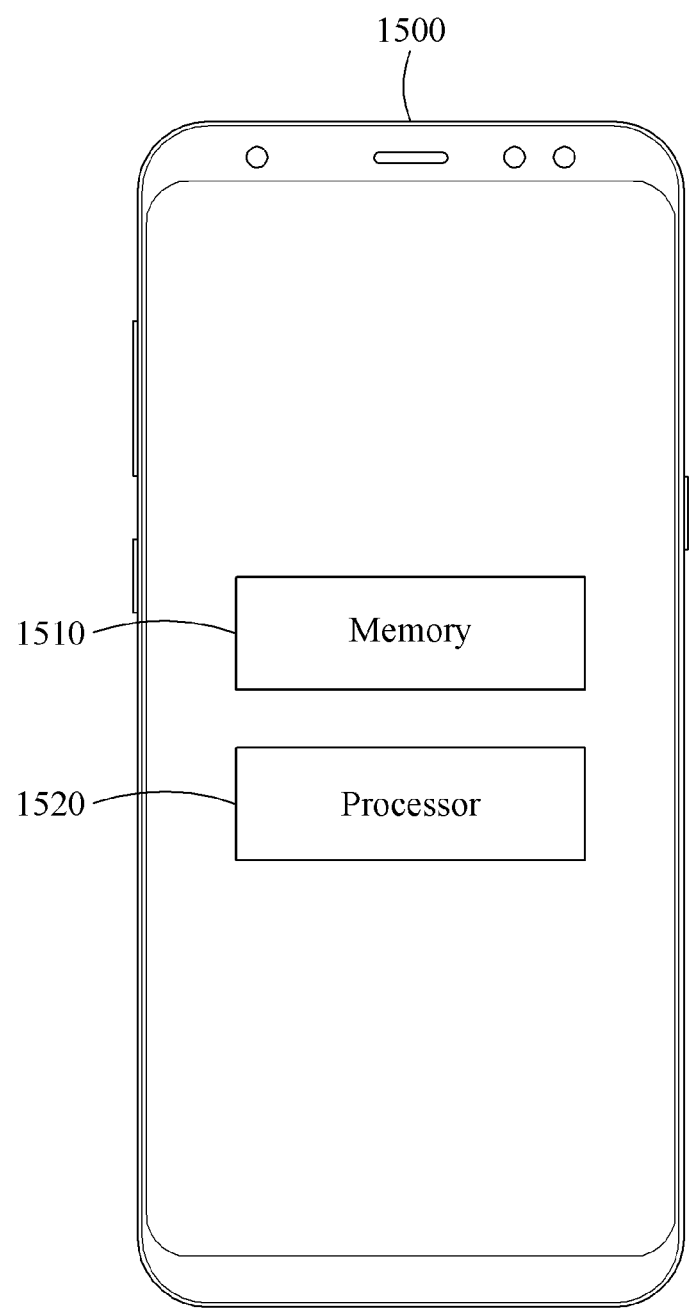

FIGS. 14 and 15 illustrate examples of an electronic device.

Referring to FIG. 14, an electronic device may be embodied as a server 1400.

The server 1400 may be a separate device distinguished from a user terminal controlled by a user and may communicate with the user terminal through a wired and/or wireless network. The server 1400 may receive requests that are simultaneously transmitted from a plurality of users through their terminals. A memory 1410 included in the server 1400 may include weights and activations of a requested neural network. The weights and activations may have the number of bits smaller than a minimum operation unit of an operator included in a processor 1420. The processor 1420 may arrange the weights and activations in respective input registers, perform a multiplication between values stored in the input registers, and then output, from an output register in which a result of the multiplication is stored, a value in a preset bit range as a result of a dot product between a first vector including the weights and a second vector including the activations. Inference results obtained through such operations described above may be returned to corresponding user terminals. The user terminals may include, for example, various computing devices such as, smartphones, tablets, laptops, personal computers (PCs), various wearable devices such as, smartwatches, smart glasses, various home appliances such as, smart speakers, smart televisions (TVs), smart refrigerators, and others such as, smart vehicles, smart kiosks, Internet of things (IoT) devices, drones, and robots.

Referring to FIG. 15, an electronic device may be embodied as a user terminal 1500. Although the user terminal 1500 is illustrated as a smartphone in FIG. 15 for the convenience of description, other devices that are controlled by a user may be applicable without limitations. The user terminal 1500 may obtain a request from a user. A memory 1510 included in the user terminal 1500 may include weights and activations of a requested neural network. A processor 1520 may arrange the weights and activations in respective input registers, perform a multiplication between values stored in the input registers, and then output, from an output register in which a result of the multiplication is stored, a value in a preset bit range as a result of a dot product between vectors. An inference result obtained through such operations described above may be provided to the user, or be used for the user terminal 1500 to perform a subsequent operation.

The server 1400 and the user terminal 1500 embodied as the electronic device as described above with reference to FIGS. 14 and 15, respectively, may perform the operations described herein, and thus a more detailed and repeated description thereof will be omitted here for brevity. The electronic device described herein may also be referred to as an accelerator system including a host processor and an accelerator.

The electronic device, and other devices, apparatuses, units, modules, and components described herein with respect to FIGS. 13-15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the method of operating a processor. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a processor, comprising:
    arranging weights together in a first input register and arranging activations together in a second input register, the weights and activations each being a smaller number of bits than a minimum operation unit of an operator included in the processor;
    performing a multiplication between first values stored in the first input register and second values stored in the second input register, the first values including the weights and the second values including the activations;
    storing a result of the multiplication in an output register; and
    outputting, from the output register, a value in a preset bit range as a result of a dot product between a first vector including the weights and a second vector including the activations, wherein a most significant bit of one of the weights is arranged at a most significant bit of the first input register and a most significant bit of one of the activations is arranged is arranged at a most significant bit of the second input register.

2. The method of claim 1, wherein the arranging comprises:
    arranging the weights in the first input register in a first order, and arranging the activations in the second input register in a second order that is a reverse order of the first order.

3. The method of claim 1, wherein a number of the weights and a number of the activations to be respectively arranged in the first and second input registers is determined based on a number of bits of each of the weights, a number of bits of each of the activations, and a number of bits of each of the first and second input registers.

4. The method of claim 1, wherein the arranging comprises:
    arranging the weights and activations in the first and second input registers at preset intervals, respectively, wherein the preset intervals are determined based on the number of bits of each of the input registers, and the respective numbers of the weights and activations to be arranged in the input registers.

5. The method of claim 1, wherein the preset bit range is based on a preset interval between the weights or activations respectively arranged in the first and second input registers.

6. The method of claim 1, wherein the outputting comprises:
    setting, as 0, a remaining bit value in the preset bit range in the output register, and shifting the value in the preset bit range to a lower bit position.

7. The method of claim 1, wherein the arranging comprises:
    arranging the weights in the first input register such that a first and last of the weights are maximally separated within the first register, or arranging the activations in the second input register such that the a first and last of the activations are maximally separated from each other within the second input register.

8. The method of claim 7, wherein the output register has a greater number of bits than the first input register and has a greater number of bits than the second input register.

9. The method of claim 1, in response to all the weights and activations not being available to be arranged in the input registers:
    the arranging comprises sequentially arranging corresponding portions of the weights and activations in the first and second input registers, respectively,
    the performing comprises sequentially performing multiplications between the corresponding portions of the weights and activations sequentially arranged in the respective first and second input registers, and accumulating results of the multiplications in the output register, and
    the outputting comprises outputting, as the result of the dot product, a value in a preset bit range from the output register.

10. The method of claim 9, wherein the outputting comprises:
    outputting the result of the dot product by setting, as 0, a remaining bit value in the preset bit range in the output register, and shifting the value in the preset bit range to a lower bit position.

11. The method of claim 1, wherein the operator is a multiplier.

12. The method of claim 1, wherein the minimum operation unit is one of 8 bits, 16 bits, 32 bits, and 64 bits.

13. A non-transitory computer-readable storage medium storing commands that, when executed by a processor, cause the processor to perform the method of claim 1.

14. A processor comprising:
    a first input registers configured to receive and store together weights and a second input register configured to receive and store together activations, the weights and activations each being a smaller number of bits than a minimum operation unit of an operator included in the processor, wherein a bit of one of the weights is stored in a most significant bit of the first input register or a bit of one of the activations is stored in a most significant bit of the second input register;
    the operator configured to perform a multiplication between first values stored in the first input registers and between second values stored in the second input register, the first values including the weights and the second values including the activations; and
    an output register configured to store a result of the multiplication, and to output a value in a preset bit range as a result of a dot product between a first vector including the weights and a second vector including the activations.

15. An electronic device comprising:
    a memory configured to store weights and activations each being a smaller number of bits than a minimum operation unit of an operator included in a processor; and
    the processor configured
        to arrange the weights in a first input register and to arrange the activations in a second input register, wherein in the first input register a first of the weights is maximally separated from a last of the weights or in the second input register a first of the activations is maximally separated from a last of the activations, to perform a multiplication between the first input register and the second input register, to store a result of the multiplication in an output register, and to output, from the output register, a value in a preset bit range as a result of a dot product between a first vector including the weights and a second vector including the activations.

16. The electronic device of claim 15, wherein the processor is further configured to:

arrange the weights in the first input register in a first order, and arrange the activations in the second input register in a second order that is a reverse order of the first order.

17. The electronic device of claim 15, wherein a number of the weights and a number of the activation to be respectively arranged in the first and second input registers is determined based on a number of bits of each of the weights, a number of bits of each of the activations, and a number of bits of each of the first and second input registers.

18. An electronic device comprising:

a memory configured to store weights and activations of a neural network; and a processor configured to:

arrange the weights in a first input register in a first order such that a first and last weights are maximally separated in the first input register, arrange the activations in a second input register in a second order such that a first and last activation are maximally separated in the second register, and such that the second order a reverse order of the first order, store, in an output register, a result of a multiplication between a first vector including the weights and a second vector including the activations, and output a value in a preset bit range from the output register, wherein each of the weights and the activations is a smaller number of bits than a minimum operation unit of an operator in the processor.

19. The electronic device of claim 18, wherein the processor is further configured to arrange the activations in the first input registers at a preset interval, and the preset interval is based on a number of bits of the first input register and a number of the activations to be arranged in the first input registers.

20. The electronic device of claim 18, wherein the processor is further configured to generate the preset interval based on dividing a difference between the number of bits of the first input register and a number of bits of the activations by one less than a depth of the first input register.

* * * * *